US008250596B2

(12) United States Patent
Weinblatt

(10) Patent No.: US 8,250,596 B2
(45) Date of Patent: Aug. 21, 2012

(54) INCENTIVE REWARDS OBTAINABLE BY A TARGETED AUDIENCE TUNED TO A BROADCAST

(76) Inventor: Lee S. Weinblatt, Teaneck, NJ (US)

( * ) Notice: Subject to any disclaimer, the term of this patent is extended or adjusted under 35 U.S.C. 154(b) by 788 days.

(21) Appl. No.: 11/245,682

(22) Filed: Oct. 6, 2005

(65) Prior Publication Data

US 2006/0080700 A1 Apr. 13, 2006

Related U.S. Application Data

(60) Provisional application No. 60/617,821, filed on Oct. 12, 2004.

(51) Int. Cl.
*H04N 7/16* (2011.01)

(52) U.S. Cl. .................. 725/23; 725/9; 725/10; 725/13; 725/14

(58) Field of Classification Search .......... 725/9, 13–17, 725/19–20, 10, 33, 23
See application file for complete search history.

(56) References Cited

U.S. PATENT DOCUMENTS

| | | | | |
|---|---|---|---|---|
| 5,034,807 | A * | 7/1991 | Von Kohorn | 725/5 |
| 6,057,872 | A * | 5/2000 | Candelore | 725/23 |
| 6,597,405 | B1 * | 7/2003 | Iggulden | 348/553 |
| 7,222,071 | B2 * | 5/2007 | Neuhauser et al. | 704/231 |
| 7,363,643 | B2 * | 4/2008 | Drake et al. | 725/34 |
| 2002/0133817 | A1 * | 9/2002 | Markel | 725/23 |
| 2003/0023968 | A1 * | 1/2003 | Nishi et al. | 725/9 |
| 2003/0172376 | A1 * | 9/2003 | Coffin, III | 725/22 |
| 2004/0255322 | A1 * | 12/2004 | Meadows et al. | 725/23 |

FOREIGN PATENT DOCUMENTS

| | | |
|---|---|---|
| EP | 0 891 084 | 6/1998 |
| EP | 1339004 A2 * | 8/2003 |
| EP | 1460787 A2 * | 9/2004 |
| WO | WO 01/65841 | 9/2001 |

* cited by examiner

*Primary Examiner* — Nicholas Corbo
(74) *Attorney, Agent, or Firm* — Cozen O'Connor

(57) ABSTRACT

A technique for providing a reward as an incentive for a monitored person to be an audience member of at least one program being performed by reproduction equipment. A programming signal is provided for broadcasting the program with a programming signal source. The programming signal is encoded with discrete code signals, such that a preset number of the code signals occur within a given period of time, to produce an output signal, and the output signal is then broadcast. The broadcast output signal is received at a site where the monitored person is located, and the code signals therein are detected. The detected code signals are recognized only if a signal manually-actuated by the monitored person is received within a predetermined time period. The number of the code signals recognized while the monitored person is an audience member of the at least one program is determined, and the number of recognized code signals is compared with predetermined reward issuance criteria. A reward is issued when the reward issuance criteria are met by the number of recognized code signals.

15 Claims, 2 Drawing Sheets

INCENTIVE REWARDS OBTAINABLE BY A TARGETED AUDIENCE TUNED TO A BROADCAST

This application claims the benefit of the filing date of U.S. Provisional Patent application Ser. No. 60/617,821, filed on Oct. 12, 2004, the content of which is hereby incorporated by reference.

FIELD OF THE INVENTION

This invention is directed to a technique applied to an audience that is listening to and/or watching a program broadcast from a program signal source as it is being performed by reproduction equipment and, more particularly, to reward persons who meet certain reward issuance criteria when they have chosen to be members of that audience by tuning in to the program signal source which is offering the reward.

BACKGROUND OF THE INVENTION

The term "program" as used herein can be a commercial type (e.g. advertisement) and/or a non-commercial type (e.g. an entertainment show), and it involves a programming signal (e.g. a television signal) obtained from a program signal source (e.g. a television station), originated by a program provider (e.g. a television network, an advertiser, or a production company) and reproduced as audio and/or video. The "broadcast" of the program can be over the airwaves, cable, satellite, or any other signal transmission medium. An "audience" for such program reproduction is constituted of the persons who perceive the program.

The program is "performed" by any reproduction equipment which results in some form that is perceptible to human beings, the most common being video and audio. The "reproduction equipment" is any and all types of units to convert a broadcast signal into human perceptible form.

The audience can be described as being "tuned" to a specific program signal source, such as a television ("TV") or radio broadcast station. The word "tuned" is applied herein to all situations in which a person chooses to be an audience member of a program or programs being broadcast by that specific program signal source, such as by twisting a dial or operating a remote control device of a TV, for example, in order to set that TV so it can receive and perform the programs from that source.

The size of an audience can be important for any one of a number of reasons. For example, a TV show must have a minimum audience size in order to survive. It also affects advertising rates. TV and radio stations charge advertisers based on two variables, namely the number of people in the audience and the qualities of the viewers in the audience. Charges are based on a certain number of dollars per thousand viewers. It can cost an advertiser to broadcast a commercial on one TV show an amount several times what it would cost on another TV show. As regards the qualities of the audience, certain advertisers want to speak to young trendsetters, while other advertisers want to speak to older viewers (e.g. drug companies) or wealthier viewers (e.g. luxury car co.). To measure these audiences, national TV samples are taken daily in the seven largest U.S. cities for network TV shows only (approximately 4,000 to 5,000 homes are included in this sample). Paper and pencil diaries are used four times a year during 3-4-week measurement periods to measure the viewing habits in the 250 other large viewing markets. These four measurement periods are called "sweep weeks", or "sweeps". During this period of time, network and local stations make every attempt to boost their ratings. Prime movies are shown, plots for sitcoms are selected which are of maximum interest, and even newscasts carry special features. Another situation when it is valuable to entice viewers is when a programming change occurs, such as when the new season starts, when a replacement show is introduced or a change in the broadcast time of a program is made. If a show does not attract viewers within the first three weeks, it has to give refunds for lower audience counts to those advertisers that had commercials broadcast during that initial period. Therefore, audience size is important, for example, to producers of TV shows, to advertisers, and to the TV stations and networks who profit from the shows and the commercials.

The incentive for a person to watch, for example, a particular network TV show and thus become a member of its audience is, of course, that person's level of interest in the TV show in relation to the attractions of competing interests. Competing for that person's viewership are the other network TV shows then being broadcast, other forms of entertainment available in the house, such as cable TV and live radio programs, recorded audio/video programs, various types of entertainment available outside of the house, and of course a host of other activities. Program providers would find it advantageous to have some incentive, other than the program itself, for attracting a person away from all those competing entertainment and non-entertainment activities to tune into a specific program and thereby increase its audience size.

It would also be advantageous for the program provider to have an incentive that could keep the person from switching away from the program. Switching by the audience is undesirable because it reduces the person's exposure not only to the TV show but also to its commercials.

One type of incentive that is in wide usage for various purposes is to provide discount coupons for the purchase of products or services. This also could include free song downloads, contests and humor (e.g. jokes, bumper stickers). For reasons of brevity and convenience, the ensuing discussion related to the present invention will refer to the incentives it provides as discount coupons or reward coupons, or just "rewards" for short. However, this in no way limits the specific nature of the incentive(s) that can be used for this invention.

A technique that provides an incentive reward for persons to tune to a program signal source has been disclosed in U.S. patent application Ser. No. 10/391,907 filed Mar. 19, 2003, Publication No. 2004/0031046 A1. Such a reward can be issued automatically when certain reward issuance criteria are met. Also, the reward can be issued promptly upon those reward issuance criteria being met. In accordance with the technique disclosed therein, such a reward is issued in a form that is convenient for the person to redeem, and it must have adequate value. Also, the issuance criteria can be easily settable, controllable, and/or modifiable.

The content of U.S. Ser. No. 10/391,907 is hereby incorporated by reference. However, for the sake of convenience, a summary is presented below of some of its features which serve to assist in explaining the present invention.

As shown above the dotted line in FIG. 1, a program signal source 1, such as a TV broadcast station, generates a broadcast output signal 2 which is a combination of a programming signal 5, an identification ("ID") code signal 7 and an event code signal 9. The ID code can be uniquely assigned to a local TV station or to a national TV network. The event code can be uniquely assigned to a specific program. One or the other code can be used by itself, or both can be used together. ID code 7 and/or event code 9 are provided along with the programming signal 5 in order to enable printing a reward coupon automatically upon certain criteria being met in connection with, for example, being tuned to the program signal source which is offering the rewards. Thus, the conventional programming signal 5 is encoded by encoder 6 with codes 7 and/or 9. The term "encoded" is used in the broadest sense to include any and all techniques for combining a programming signal with other signals for broadcasting them together by a well known, commonly used broadcast transmitter 8.

Signal 2 is received by program reproduction apparatus 3 which is capable of performing the programming signal, such as in video and/or audio, at a site of an audience member, such as in the home. The reproduction apparatus 3 also provides a signal 2A, related to signal 2, as an input to reward output apparatus 10 which is automatically actuated, when certain audience-related reward issuance criteria are met, to print a reward on a printer 37 located at the site of such audience member.

The specific broadcasting and encoding techniques chosen depend on various design considerations. The code signals can be either analog or digital. The encoding, transmission, detection and decoding of such data signals are conventional and readily apparent to anyone with ordinary skill in the art. Such specifics do not form a part of the present invention. Details thereof would add unnecessarily to the length and complexity of this description. Consequently, such details are not provided herein.

Broadcast receiver 11 of apparatus 3 processes the received programming signal 5 and inputs it, as signal 5A, to reproduction device 13. Thus, if apparatus 3 is a TV set, receiver 11 could be a tuner, and device 13 is the TV screen and its related circuitry and components.

The output signal 2A of receiver 11, which can contain ID code signal 7 and event code signal 9, is provided to decoder 15. Decoder 15 includes circuitry to extract a signal containing the code signals 7, 9 from signal 2A. Such circuitry is well known, and thus details thereof are not needed herein. Decoder 15 determines whether its input has received a code signal and, if so, it outputs signals 7A and 9A, respectively corresponding to the code signals 7 and 9, to controller 17. Signals 7A and 9A can be respectively identical to the code signals 7 and 9 obtained from broadcast signal 2 via receiver 11, or they can be a minimally changed version thereof (e.g., amplified), or they can be a substantially changed version, depending on the specific signals and the encoding/decoding technique chosen and based on well known design considerations.

Controller 17 can be a suitable microprocessor chip that is programmed to implement a sequence of operations for recognizing when certain tuning criteria have been met and, if so, to trigger reward processing circuit 35 into retrieving reward printing data from memory 39 for use in printing a reward on printer 37. More details of controller 17 are provided below.

Apparatus 3 is a conventional part of a commercially available video and/or audio instrument, such as a TV set. Apparatus 10 could be embodied as a separate box that houses all of its components. Apparatus 10 is located in the viewers home. Only minimal retrofitting of the TV, for example, would be required in order to implement the invention, such as connecting the broadcast receiver 11 (e.g. TV tuner) to the decoder 15. The connection to the TV set could be with a direct line or by remote signal transmission (e.g. RF, infrared, sonic). Other than that, the installation of the box housing apparatus 10 is very simple in that it just needs to be plugged into the socket of a wall outlet to receive power. Only a one-time, fast, simple installation is involved that requires no retrofit of other apparatus in the house.

Alternatively, apparatus 10 could have its circuitry incorporated into the electronics of the TV. For example, the electronics could be fabricated on the semiconductor chip used to control operation of a TV and the viewing of programs on it. Such TV chips are becoming increasingly sophisticated with modern TVs being provided with added functionality approaching that of a computer. The cost of adding such circuitry to a TV chip is minimal considering the large number of chips over which the cost would be spread.

The parameters for the reward issuance criteria are stored in memory 38. A key aspect of that technique is that the reward issuance criteria specify a minimum number of ID codes and/or event codes that must be detected within a designated interval. For, example, the interval can be the duration of a certain program, a certain time of the day, any period of a certain duration, or an entire day.

The ID reward issuance parameters and event reward issuance parameters are stored in memory 38 with a one-time, preset, fixed data storage operation. Alternatively, memory 38 can be of the rewritable type to which a reward issuance criteria signal 66 is input. Signal 66 can be provided via a transmission medium, such as a telephone line to device 10 provided for this purpose. Alternatively, signal 66 can be transmitted in combination with programming signal 5, in the same way as codes 7 and 9 are combined therewith. This could occur once per day or as needed.

In order to issue the rewards, such as by printing, reward print data memory 39 holds the necessary reward output data which includes all of the data specific to the particular reward that is required in order to print it. Such data includes, for example, the text, font, graphics, formatting, symbols, background color, font color, and so on. Alternatively, this data can be provided via the above-mentioned transmission medium or it can be included in a reward data signal which is combined with programming signal 5 and transmitted along with the programming signal as part of output signal 2, as disclosed in U.S. application Ser. No. 10/080,949, filed Feb. 20, 2002. A variation of this approach is to pre-store some of this data in memory 39.

Timer 14 is provided to enable apparatus 10 to carry out its time-related activities. Timer 14 is typically an accurate clock. Preferably, it should not be accessible for setting by the audience because this could lead to fraudulent issuance of rewards which depends on preset time intervals, as explained in more detail below.

Returning to FIG. 1, the ID and/or event codes are transmitted at a predetermined rate and timing. Details of when the codes are transmitted, how many are transmitted per unit of time, etc. are provided in U.S. Ser. No. 10/391,907. Suffice it to say for present purposes that the number of transmitted codes is significant because, inter alia, it impacts on the reward issuance criteria which are based on the number of detected codes. More specifically, controller 17 preferably includes counters for determining how many ID codes and how many event codes have been decoded by decoder 15 and input to controller 17 as signals 7A, 9A. Controller 17 determines whether the preset number of ID codes that is stored as an ID reward issuance parameter has been exceeded. If it has, then the ID reward is printed. If the interval has been exceeded, then the ID counter is reset and, likewise, the event counter is reset, so that the next interval begins with a count of zero. A similar procedure is performed with respect to the event codes in that controller 17 checks to determine whether the preset number for the event codes has been exceeded. If it has, then a print of the reward is made promptly and automatically.

When controller 17 determines that a reward is to be issued, a signal is inputted to reward processing circuit 35 and reward print data memory 39 (FIG. 1). Reward processing circuit 35 utilizes the data retrieved from memory 39 to print the appropriate reward via printer 37, as explained above.

As stated in U.S. Ser. No. 10/391,907, different rewards can be provided for exceeding the criteria for each of the event code and the ID code. Likewise, different rewards can be issued relative to the length of the total viewing period, based on the number of detected codes. The more codes that are detected, the more valuable is the reward. Also, a different interval in terms of length, date and/or time can be provided for the detection of the event code and the ID code. In addition, rather than making only a single reward available, multiple rewards can also be provided for the detection of a preset number of the event code and/or the ID code. Also, the reward can be issued other than by printing. For example, rather than printing the reward as a coupon made of paper and ink, the reward data can be outputted to a portable electronic storage device, such as a smartcard. The smartcard could be inserted into a reader at a merchant's shop designed to read the reward data and enable redemption without the necessity to use paper and ink. Other possible variations include combining memories 38 and 39. Furthermore, the sequence of steps in the flow charts depicted in the drawings can be modified with equivalent results.

The technique disclosed in U.S. Ser. No. 10/391,907 is a valuable contribution to the prior art. It effectively achieves the aim of rewarding an audience member's viewership without requiring any active incentive-related participation by the viewer other than to tune in to particular program. The determination of whether or not to issue a reward is based on detection of codes 7 and/or 9, regarding which the viewer can remain completely passive. However, it is this passivity which leaves an opening for possible misuse or abuse of this technique. In particular, the viewer need not, in fact be actively viewing the program as long as the TV is tuned to the program and codes are being received by apparatus 10. Thus, an example of misuse is a viewer who has fallen asleep in front of the TV for an extended period. Such a person is tuned in to the program, but cannot be truly counted as a viewer. An example of abuse is a viewer who turns on the TV in the morning and then goes to work for the day. While the person is at work, the codes are being detected, counted and applied toward meeting the reward issuance criteria. It is desirable to eliminate such situations from qualifying for rewards.

SUMMARY OF THE INVENTION

One object of the present invention is to issue incentive rewards only to audience members who are present and actively viewing a program associated with such rewards.

This and other objects are attained in accordance with one aspect of the present invention directed to a technique for providing a reward as an incentive for a monitored person to be an audience member of at least one program being performed by reproduction equipment. A programming signal is provided for broadcasting the program with a programming signal source. The programming signal is encoded with discrete code signals, such that a preset number of the code signals occur within a given period of time, to produce an output signal, and the output signal is then broadcast. The broadcast output signal is received at a site where the monitored person is located, and the code signals therein are detected. The detected code signals are recognized only if a signal manually-actuated by the monitored person is received within a predetermined time period. The number of the code signals recognized while the monitored person is an audience member of the at least one program is determined, and the number of recognized code signals is compared with predetermined reward issuance criteria. A reward is issued when the reward issuance criteria are met by the number of recognized code signals.

DETAILED DESCRIPTION OF THE DRAWINGS

Figure 1:
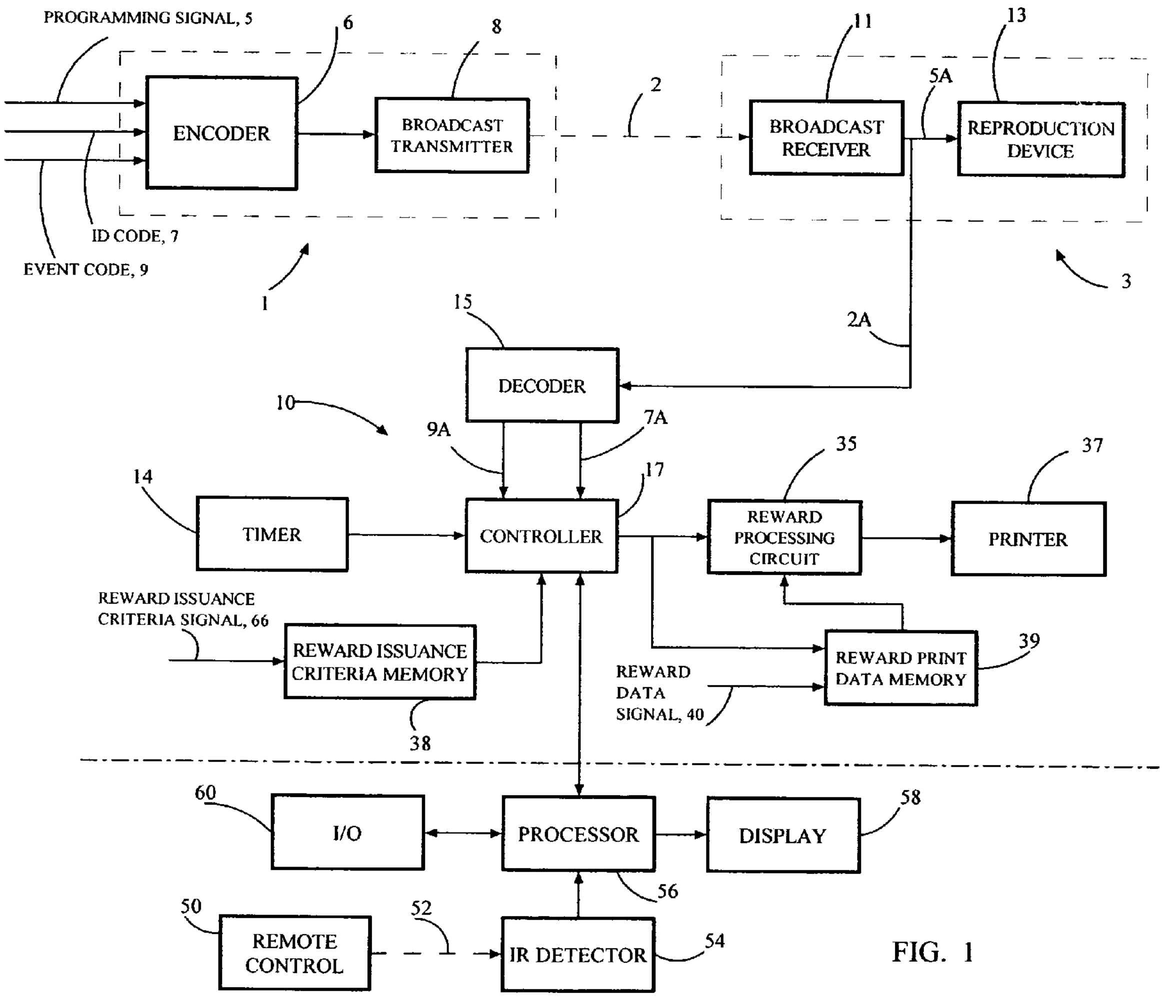
FIG. 1 is a schematic block diagram for explaining the invention showing the arrangement disclosed in U.S. Ser. No. 10/391,907 above the dotted line, and a modification in accordance with an embodiment of the present invention below the dotted line.

In accordance with the present invention, it is possible to determine when ID and/or event codes are being improperly accumulated toward meeting a reward issuance criterion when no one is an active viewer of the program. This requires a manually-actuatable unit that sends a signal when activated by the viewer. Such a unit can be one dedicated to this task. However, the invention is cognizant of the fact that remote controls are sold with almost all TVs. Thus, it can be safely assumed that any household with a TV will also have a remote control. The remote control in its conventional form is used in accordance with the present invention as a manually actuatable unit to enable performance of a checking function on the presence and alertness of the viewer by requiring the viewer to activate the remote control at least once during a specified period of time. This poses no real hardship on the viewer because under normal usage of the remote control it is activated frequently for changing channels, controlling the sound volume, and for turning mute on/off. Thus, it is reasonable to expect that the remote control will be activated to emit its signal at least once, say, every 60 minutes. Programs typically run no longer than an hour. Thus, within that 60 minutes the viewer may change channels to another program. Also, even within the hour it is a well established fact that remote controls are used to "zap" commercials by changing to another channel for the expected duration of the commercial. Of course, shorter or longer periods can be selected depending on various applicable factors that may be of particular import for any particular set of circumstances.

Remote control 50 is a typical unit of conventional design that emits an infrared (IR) signal 52 in the general direction in which it is aimed. IR detector 54 is installed in apparatus 10 and positioned to detect IR signal 52 when remote control 50 is activated by the viewer and aimed at the TV. IR detector 54 can be, for example, module no. GP1UD281YK, available from Sharp, which allows remote controls to operate on a broad range of ambient light levels.

The output of IR detector 54 is presented to a digital processor 56, such as model no. TMS320VC5401PGE50-0 available from Texas Instruments. When the output of IR detector 54 is indicative of a signal emitted from remote control 50, processor 56 initiates a subroutine performed in controller 17 and which is described in connection with FIG. 2. To complete the description of FIG. 1, a display 58 is provided for a purpose described below. Also, an I/O communications unit 60 is provided to enable signals to be sent to and from processor 56, as explained in greater detail below.

As explained above, a time limit is set during which a signal from remote control 50 must be received in order for the ID and event codes that are being received to count toward meeting a reward issuance criterion. A timer, which can be a part of processor 56, has the time limit set into it, and the processor counts down to zero (or vice versa), as per operation 70 in FIG. 2. Thus, if the time limit is 90 minutes, the timer will keep track of whether this time limit has been exceeded.

Processor 56 checks, per 72, whether a signal has been received from IR detector 54 to indicate an emission from remote control 50. If no such IR signal from remote control 50 has been received, processor 56 determines whether the countdown is within 10 minutes of reaching the time limit. Of course, the number 10 is a matter of design choice. If the 10 minute mark has been reached, i.e. 80 minutes have elapsed without any IR signal having been detected from remote control 50, processor 56 causes display 58 to provide some indication to the viewer of that status. Display 58 can be an LED on apparatus 10 that changes color from green to red, or the LED can turn from a solid light to a flashing light, or any one of many other possibilities that will readily occur to anyone with ordinary skill in the art. The point is to alert the viewer that she/he must activate the remote control in order to avoid being considered as a non-active viewer of the program. Of course, the viewer has been previously informed about the meaning of display 58 and its signals, so that its connection to the reward issuance is clearly understood. The need for display 58 occurs for those situations when a person is an active viewer but it so happens that there has been no reason to activate remote control 50. Such a situation is within the realm of possibility. So, this feature enables the viewer to inform the system that "Yes, I am here and I am actively viewing the program." The only action required is to turn mute on/off quickly, or just slightly tweak the sound volume. The specific encoded IR signal from the remote control is not important for this purpose but, rather, just an amplitude of an IR signal above ambient conditions.

If the warning on display 58 does not result in a response from the viewer, processor 56 keeps checking and re-checking during that 10 minute interval until the time limit is reached, as per 80. If and when that occurs, codes that are detected thereafter are not recognized. In particular, further operation of controller 17 to accumulate received codes is blocked. Thus, a person who is not actively viewing the program, as indicated by the fact that time expired with no activity on the remote control 50 having been detected, will not receive credit for viewing time beyond that point.

If at step 72 an IR signal has been detected, then the processor 56 determines at 82 whether controller 17 has been blocked, as per 80 described above. If it has not, then the routine progresses to resetting the timer, as per 84, so that it starts from the beginning to count down the full allotted time of 90 minutes. If the controller 17 is in a blocked condition, then it is released, per 86, and then the timer is reset, per 84.

Figure 2:
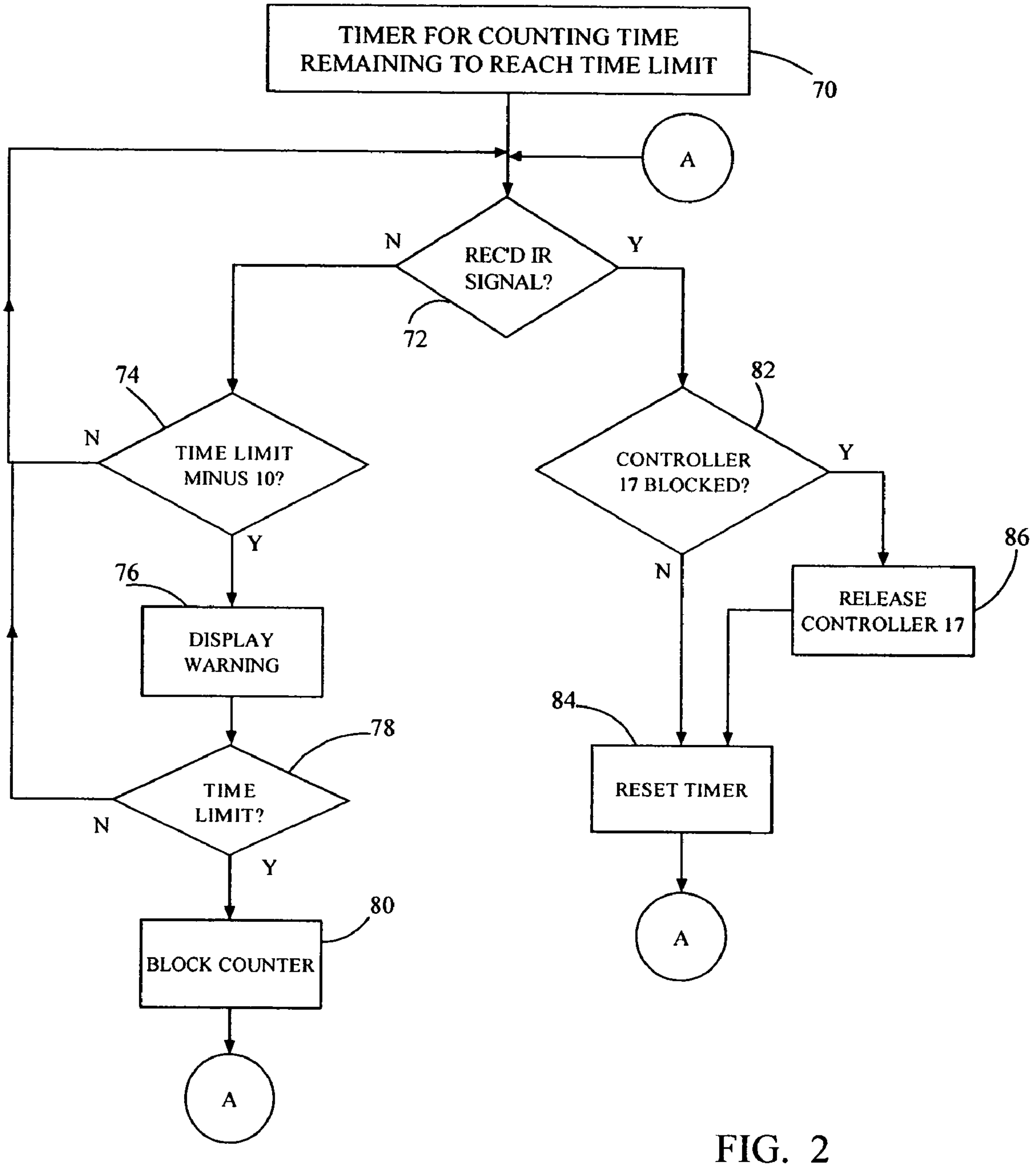
FIG. 2 is a flow chart for showing operations to determine whether a viewer is actively viewing a program.

It should be understood that although display 58 is shown in FIG. 1 as an individual component, it could be integrated into the TV so that a message, or at least a light, appears on the TV screen rather than on apparatus 10.

It should also be understood that although processor 56 is shown as an individual component, it could be a part of controller 17.

Whether or not to recognize detected codes can be determined by another approach in accordance with the present invention which does not block controller 17 from accumulating detected codes toward meeting the reward issuance criteria. Instead, all the IR signals from IR detector 54 are stored along with the time stamp information from timer 14 and detected code information. The following table is an example of how this information can be stored.

| TIME | ID CODE | EVENT CODE | IR SIGNAL |
|---|---|---|---|
| 600 | A1212 | | |
| 675 | | B2233 | |
| 700 | A1212 | | |
| 725 | | B2233 | |
| 825 | | C4236 | |
| 875 | | C4236 | |
| * | * | * | * |
| * | * | * | * |
| * | * | * | * |
| 1900 | | | XXXX |
| 2000 | D6640 | | |
| 2075 | | A1270 | |
| 2150 | | A1270 | |
| 2200 | D6640 | | |

This table illustrates that at time 600 (the time units, e.g., seconds, are a design choice, as is the start time of the count) an ID code was received from a program source, (e.g., a TV station) identified as A1212, and was repeated at time 700. Apparently these ID codes are transmitted at a spacing of 100 units. Also, an event code was received at time 675 for a program identified by the code B2233, and was repeated at time 725. Apparently these event codes are transmitted at a spacing of 50 units. At time 825 the TV had been switched to another program identified by the event code C4236. Since there was no intervening signal from the remote control, and no new ID code was received, this program change was due to the start of a new program.

At time 1900 an IR signal was detected. It is identified as XXXX because for purposes of the present invention the specific IR code transmitted by the remote control, e.g. to change channels or to vary the sound volume, is immaterial, and, therefore, is not processed. The IR detector is set to detect any IR signal above a certain threshold representative of ambient conditions, and processor 56 records that only as an occurrence of an IR signal.

At time 2000 the ID code changed to indicate a program source identified by D6640. Since this was preceded by an IR signal from the remote control at time 1900, this change was due to a channel change activation by the viewer. At times 2075 and 2150, event code A1270 was received, transmitted at a spacing of 75 units. Another D6640 ID code was received at 2200, indicative that it is being transmitted at a spacing of 200 units. Of course it will be understood that the codes, times and transmission rates shown above are arbitrary, and are being shown for illustrative purposes only.

The information shown in the table presented above is not acted upon in real time. In the first embodiment described above, the invention acts in real time to block operation of controller 17 if a signal is not received from the remote control before expiration of the time limit. In the present embodiment, operation of all the circuitry is permitted to continue unimpeded. All the detected codes are stored along with the timer and IR signal information. All this data is sent by I/O circuitry 60 to a remote computer processing center. Transmission of this data is performed at preset times, such as once per day or once per hour. The data is processed to determine when signals from the remote control 50 were received. If a period of more than, say, 90 minutes elapsed after an IR signal detection appears in the last column, then the detected codes in the second and third columns which follow are not counted toward meeting the reward issuance criteria. The details of how this can be implemented in software at the computer processing center are readily apparent to anyone with ordinary skill in the art and, thus, it is not deemed necessary to provide such details herein.

A further embodiment of the invention takes advantage of the actual, coded IR signal which is transmitted by the remote control. It was explained above that the specific IR code transmitted by the remote control, e.g. to change channels or to vary the sound volume, is immaterial. However, in the present embodiment such data is stored and utilized. Consequently, for this embodiment the last column of the above-presented table would not store just the detection of an IR signal, as represented by XXXX. Instead, it would store the actual IR code transmitted by the remote control 50. This provides a powerful analysis tool to enable making determinations on when a viewer switched channels, what channel was being viewed at any given time, whether and when mute was turned ON, and so on. This can provide very valuable information about, for example, the effectiveness of the program, e.g. a commercial, to hold the viewer's attention. The details of how this can be implemented in software at the computer processing center are readily apparent to anyone with ordinary skill in the art and, thus, it is not deemed necessary to provide such details herein.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

I claim:

1. A method for providing a reward as an incentive for a monitored person to be an audience member of at least one program being performed by reproduction equipment, comprising the steps of:

providing a programming signal for broadcasting the program with a programming signal source;

encoding said programming signal with code signals, such that a preset number of said code signals occur within a given period of time, to produce an output signal;

broadcasting the output signal;

receiving the broadcast output signal at a site where the monitored person is located, and detecting the code signals therein;

recognizing the detected code signals only if a signal manually-actuated by the monitored person is received within a predetermined time period, wherein a plurality of the detected code signals are recognized in response to a single said signal manually-actuated by the monitored person being received within the predetermined time period;

determining a total count of said code signals recognized while the monitored person is an audience member of the at least one program;

comparing the total count of recognized code signals with predetermined reward issuance criteria; and issuing a reward when the reward issuance criteria are met by the total count of recognized code signals.

2. The method of claim 1, wherein the reward issuance criteria are related to being an audience member of a particular program.

3. The method of claim 1, wherein the reward issuance criteria are related to being an audience member tuned to a particular program signal source.

4. The method of claim 1, wherein said reward is issued to the monitored person who is an audience member promptly upon said issuance criteria being met.

5. The method of claim 4, wherein said reward is a discount coupon printed at said audience member's location.

6. The method of claim 1, wherein said reward is issued to the audience member automatically upon said issuance criteria being met.

7. The method of claim 1, wherein said plurality of code signals are equally spaced within said given period of time.

8. The method of claim 1, wherein said reward issuance criteria include a threshold period of time as reflected by the occurrence of at least a specified number of detected code signals.

9. The method of claim 1, wherein said reward issuance criteria are selectively adjustable.

10. The method of claim 1, wherein said step of recognizing the detected code signals comprises accumulating the count of the detected code signals only if said signal manually-actuated by the monitored person is received within a predetermined time period and, otherwise, blocking said accumulation.

11. The method of claim 10, further comprising unblocking said accumulation upon receipt of a signal manually-actuated by the monitored person whenever such accumulation is in a blocked mode.

12. The method of claim 1, wherein said step of recognizing the detected code signals comprises storing all the detected code signals, storing all signals manually-actuated by the monitored person, attributing the detected code signals toward meeting the reward issuance criteria only if at least one of said signals manually-actuated by the monitored person is received within a predetermined time period and, otherwise, not attributing the detected code signals toward meeting the reward issuance criteria.

13. The method of claim 1, generating a warning to the monitored viewer when a particular predetermined time period is about to expire and no signal manually-actuated by the monitored person has been received within that time period.

14. The method of claim 1, wherein a remote control from a TV set is used to generate the signal manually-actuated by the monitored person, and wherein the method further comprises the step of storing the signal received from the remote control to enable determination of what command was activated by the monitored person.

15. An apparatus for providing a reward as an incentive for a person to become an audience member of at least one program being performed by reproduction equipment, comprising:

means for providing a programming signal for broadcasting the program with a programming signal source;

means for encoding said programming signal with code signals, such that a preset number of said code signals occur within a given period of time, to produce an output signal;

means for broadcasting the output signal;

means for receiving the broadcast output signal at a site where the monitored person is located, and detecting the code signals therein;

means for recognizing the detected code signals only if a signal manually-actuated by the monitored person is received within a predetermined time period, wherein a plurality of the detected code signals are recognized in response to a single said signal manually-actuated by the monitored person being received within the predetermined time period;

means for determining a total count of said code signals recognized while the person is an audience member of the at least one program;

means for comparing the total count of recognized code signals with predetermined reward issuance criteria; and means for issuing a reward when the reward issuance criteria are met by the total count of recognized code signals.

* * * * *